June 8, 1954  K. H. ANDREN  2,680,394
WIRE CUTTING AND STRIPPING MACHINE
Filed Nov. 8, 1949  3 Sheets-Sheet 1
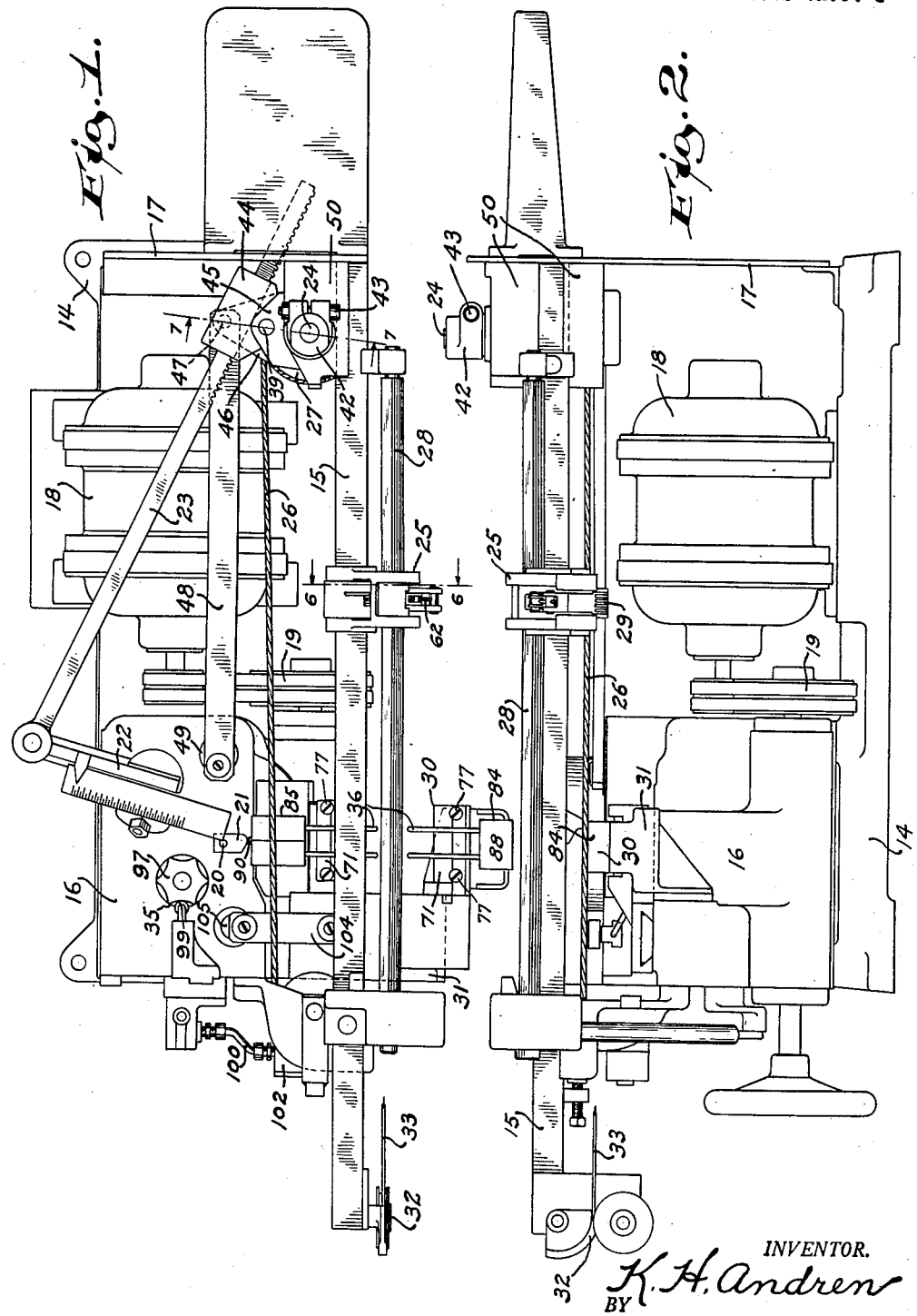
INVENTOR.
K. H. Andren
BY
Lieber & Lieber
ATTORNEYS.

June 8, 1954 K. H. ANDREN 2,680,394
WIRE CUTTING AND STRIPPING MACHINE
Filed Nov. 8, 1949 3 Sheets-Sheet 2

INVENTOR.
BY K. H. Andren
Lieber & Lieber
ATTORNEYS.

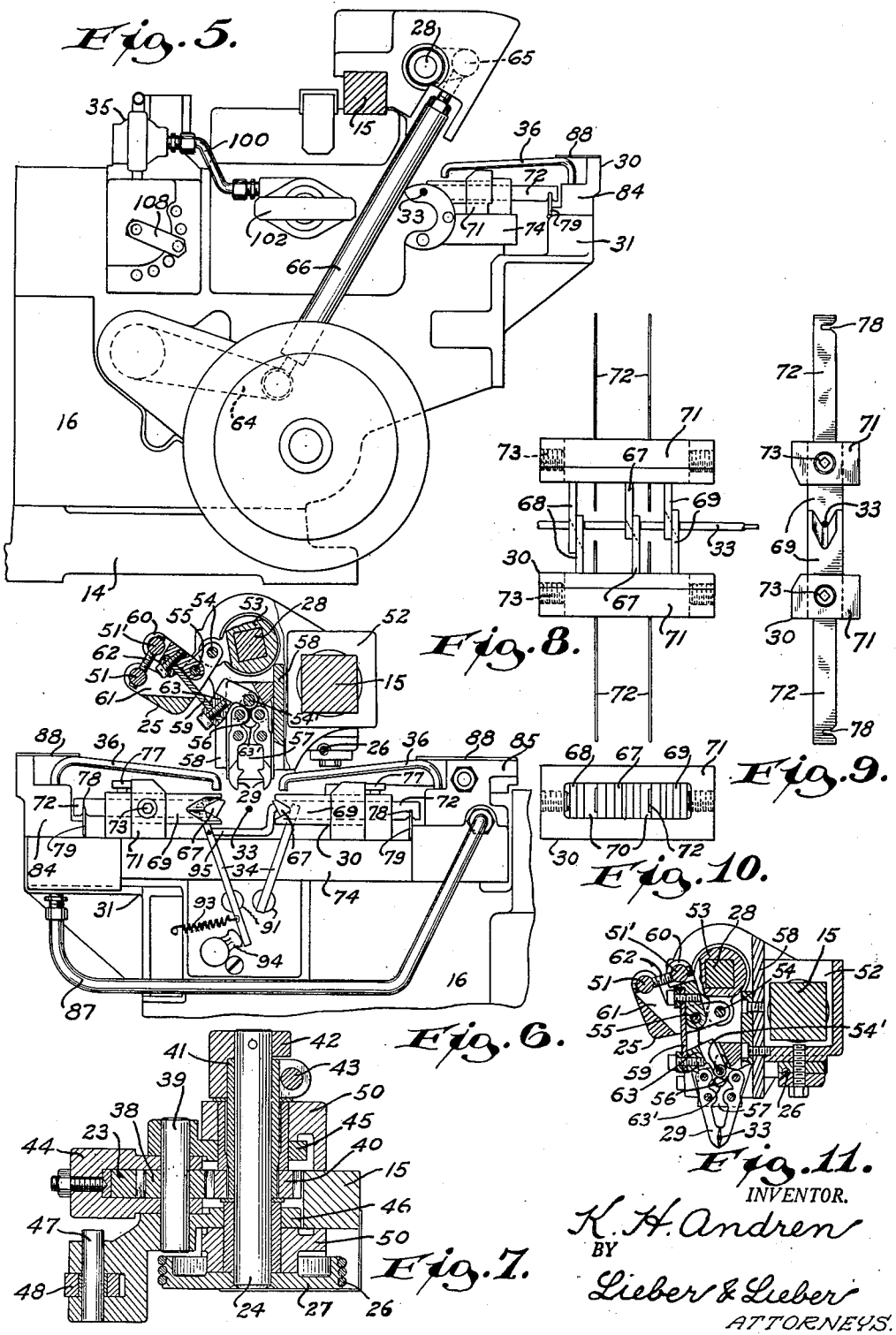

Patented June 8, 1954

2,680,394

UNITED STATES PATENT OFFICE 2,680,394

WIRE CUTTING AND STRIPPING MACHINE

Karl H. Andren, Greenfield, Wis., assignor to Artos Engineering Company, Milwaukee, Wis., a corporation of Wisconsin Application November 8, 1949, Serial No. 126,225

6 Claims. (Cl. 81—9.51)

The present invention relates generally to improvements in the art of severing elongated coated stock into successive lengths and of removing the coatings from selected portions thereof, and relates more specifically to improvements in the construction and operation of insulated wire cutting and stripping apparatus for producing electrical conductors.

The primary object of my present invention is to provide various improvements in the construction and operation of cutting and stripping machines for insulation covered wire or the like, whereby the manipulation and operation of such equipment is simplified, while the accuracy and speed of performance are materially enhanced.

It has heretofore been common commercial practice to use so-called cutting and stripping machines to automatically sever insulated wire into successive predetermined lengths and to strip some of the insulation from the opposite ends of the severed lengths. In perhaps the most practical and successful of these prior machines, a pair of cooperating knives sever the wire into successive lengths as it is fed longitudinally past the cutting and stripping zone by one or more reciprocable jaw clamps, and sets of insulation cutting and stripping blades disposed on opposite sides of the wire severing knives are utilized to cut and strip insulation from the severed wire ends by causing the clamp or clamps to pull these ends away from the plane of severance. The earlier of these prior mechanisms embodied two oppositely movable jaw clamps in order to effect advancement of the wire and subsequent stripping motion, but these were later modified to eliminate one of the clamps.

While these prior wire cutting and stripping devices were quite satisfactory in operation, they did involve considerable effort and loss of time when changing the severing knife and stripper blade assemblages for cooperation with different kinds of wire, and it was also rather difficult to positively remove and eject insulation strippings from the cutting zones thereof. Then too, the clamp and clamping jaw actuating mechanisms of these prior machines especially when only a single clamp was employed, were not entirely satisfactory when operating at high speed; and the holding finger and knife actuating equipment for effecting long length cutting and stripping was relatively complicated and gave some trouble due to wear of parts. This wearing of parts resulted in inaccurate cutting unless rather frequent adjustments were made, and while I have made periodic improvements in the drives for such machines as shown in my prior Patent No. 2,464,959, granted March 22, 1949, and in the cutting and stripping knife and ejector plate assemblages as shown in my Patent No. 2,497,112, granted February 14, 1950, these have not eliminated all of the above mentiontd objections and difficulties.

It is therefore an object of my present invention to provide an improved automatic wire cutting and stripping unit which does in fact meet all of the above mentioned requirements and which effectively eliminates the previous objectionable features, thus producing a mechanism which is flexible in its adaptations and highly efficient in operation.

Another important object of this invention is to provide an improved mode of mounting wire severing and insulation stripping knife assemblages of the general type shown and described in my abovementioned copending application, whereby changing or replacement of these assemblages is greatly facilitated and minimum time is lost in doing so.

A further object of the invention is to provide improved means for positively ejecting the removed pieces of insulation from the stripping zone of a wire stripping machine with the aid of compressed air or the like.

Still another important object of the present invention is to provide improved mechanism for rapidly but accurately feeding wire or the like through the cutting or stripping zone of a machine for producing successive electrical conductors of any desired length from continuous insulated wire or similar stock, so that both the overall length of the pieces and the stripping at the ends thereof are uniform and precisely as contemplated.

An additional object of my invention is to provide an improved single clamp wire stock feeder for a wire length cutter and stripper, in which the jaws are rapidly and positively operable to firmly grip and advance the wire when operating at any desired speed.

Another object of the instant invention is to provide improved instrumentalities for driving the clamp and holding fingers of a long section cutting wire stripping installation having a single feed clamp cooperating with these fingers, whereby accurate production of equally long lengths of the successive final conductors is assured.

A further object of the present invention is to provide an improved wire cutting and stripping machine in which the various parts may be quickly and conveniently adjusted to insure utmost precision when operating at either high or low speeds, and which will function automatically when cutting either single or multi-strand wire stock of various diameters and types.

Still another object of this invention is to provide numerous improvements in the details of construction and operation of automatic wire cutting and stripping devices whereby the dependability, flexibility, and capacity are enhanced to a maximum.

These and other more specific objects and advantages of the invention will be apparent from the following detailed description.

A clear conception of the several improvements constituting my present invention, and of the construction and operation of a typical wire cutting and stripping unit embodying the same, may be had by referring to the drawings accompanying and forming a part of this specification in which like reference characters designate the same or similar parts in the various views.

Fig. 1 is a top view of a typical insulated wire cutting and stripping mechanism or machine built in accordance with the present invention;

Fig. 2 is a front elevation of the same mechanism, looking toward the cutting and stripping zone;

Fig. 5 is an enlarged end elevation of the mechanism or machine shown in Figs. 1 and 2, looking in the direction of advancement of the wire stock, and also showing details of construction of the long cutting mechanisms;

Fig. 6 is an enlarged transverse section taken along the line 6—6 of Fig. 1, through the single wire feed clamp of the machine, showing the clamping jaws vertically elevated and separated, and also showing the wire cutting and stripping knife assembly in the background;

Fig. 7 is a similarly enlarged transverse section taken along the line 7—7 of Fig. 1 and showing details of the feed clamp actuating mechanism;

Fig. 8 is a likewise enlarged top view of the removable wire cutting and insulation stripping knife assemblage alone;

Fig. 9 is a side elevation of the same removable assemblage showing the knife blades in action;

Fig. 10 is an end view of the same assemblage; and

Fig. 11 is another transverse section through the wire feeding clamp, similar to that of Fig. 6 but showing the clamping jaws in action.

Figure 3:
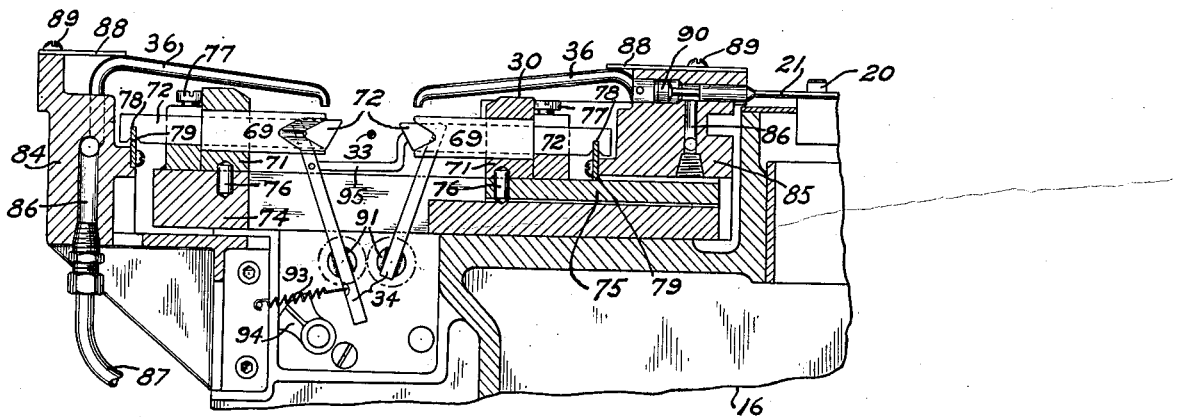
Fig. 3 is an enlarged transverse section through the cutting and stripping zone of the same machine with the wire feed mechanism omitted but showing the stock holding fingers.

While the invention has been shown and described as being especially applicable to an electric motor driven unit for automatically cutting and stripping insulation covered wires for the electrical industry, it is not my desire or intention to unnecessarily restrict the utility of the improved features by virtue of this limited disclosure, and it is moreover contemplated that specific descriptive terms used herein be given the broadest possible interpretation consistent with the actual disclosure.

Referring to Figs. 1, 2 and 5 of the drawing, the typical insulated wire cutting and stripping machine shown therein, comprises in general a unitary base plate 14 having a sturdy square horizontal polygonal beam 15 rigidly mounted thereabove by means of a casing or frame 16 at one end and a support 17 at its opposite end; a propelling motor 18 mounted upon the base plate 14 and having its shaft connected by a V-belt drive 19 to speed reducing mechanism confined within the casing 16; rotary motion transmitting mechanism of the type shown in my Patent No. 2,464,959 also housed within the casing 16 and having its driving shaft operable by the speed reduction gearing while its driven shaft 20 extends upwardly from within the casing frame and has a small cam 21 secured thereto; a variable length intermittently rotatable crank 22 also driven by the concealed motion transmitting mechanism and being drivingly connected through a rack bar 23 with a counter-shaft 24 carried by the rigid beam 15; a wire stock feeding clamp assembly 25 movable back and forth along the beam 15 by a continuous cable 26 cooperating with a sheave 27 associated with the counter-shaft 24; a polygonal clamp jaw actuating bar 28 disposed parallel to the beam 15 and being periodically oscillatable about its axis to open and close the jaws 29 of the clamp assembly 25; a wire cutting and stripping assemblage 30 fixedly mounted on plates cooperating with a fixed sub-frame 31 near the feed end of the main frame 16 and beam 15; a guide 32 for the incoming wire stock 33 suspended from the extreme feed end of the beam 15 beyond the assemblage 30; a pair of wire stock holding fingers 34 (Figs. 3 and 4) cooperable with the wire stock 33 between the guide 32 and the assemblage 30; long cutting mechanism 35 (Fig. 4) mounted upon the casing 16 for controlling the operation of the working tools; and means including nozzles 36 and the cam 21 for delivering jets of compressed air to the cutting and stripping zone of the machine after each stripping operation.

The base and frame structure of the cutting and stripping unit may be varied in construction throughout a considerable range, and while the main upper beam 15 is shown as being square in transverse cross-section, this may be otherwise polygonal or non-circular. Since the drive mechanism which is interposed between the motor 18 and the mechanisms for actuating the feed clamp 25, the wire cutting and insulation stripping assembly 30, the holding finger control devices, and the control for the air delivered to the nozzles 36, is primarily of the type shown in my prior patent, this drive mechanism need not be specifically described herein. The present improvements therefore reside in and are confined principally to the mechanism for advancing the single stock feed clamp 25 and for opening and closing the jaws 29 thereof, to the removability of the tool assembly 30, to the air jet apparatus for positively ejecting the stripped pieces of insulation from the cutting and stripping zone, and to the control devices for the working tools especially when performing long cutting.

Referring especially to Figs. 1, 2, 5, 6, 7, and 11, the improved mechanism for advancing and for actuating the single wire feed clamp 25 comprises in general the intermittently rotatable crank 22; the rack bar 23; the counter-shaft 24; the cable 26 and sheave 27; a stripping motion producing device also cooperable with the counter-shaft 24; and means for periodically oscillating the square bar 28 to open and close the clamping jaws 29. The rotary crank 22 is adjustable in length to vary the throw and hence the distance travelled by the clamp 25 during each crank revolution, and the end of the bar 23 remote from the crank 22 is provided with rack teeth which mesh with an idler pinion 38 carried by a pivot shaft 39, see Figs. 1 and 7. The pinion 38 in turn meshes with a gear 40 secured to a sleeve 41 which embraces the counter-shaft 24, and the sleeve 41 may be secured to the shaft 24 in various angular positions by means of a clamping bushing 42 and bolt 43. The toothed end of the rack bar 23 is reciprocable within a bracket 44 which is swingably suspended from the pivot shaft 39 and this shaft 39 is mounted for limited swinging movement about the axis of the counter shaft 24 by means of upper and lower cranks 45, 46 which are integrally united and the outer swinging end of the lower of which carries a pivot pin 47. This pin 47 is connected by a bar 48 to a crank or eccentric 49 which is operable by the driving mechanism within the frame casing 16 so as to periodically control the insulation stripping motion of the clamp assembly 25 by actuating the cranks 45, 46, the bracket 44, pivot shaft 39, and the idler pinion 38 and the elements coacting therewith. This assemblage of elements is carried by a frame 50 secured to the beam 15, and the reversible rack and pinion mechanism constitutes simple means for effecting accurate stripping of the ends of the successive wires.

The improved single feed clamp assemblage 25 is best illustrated in Figs. 6 and 11, and consists primarily of a bracket 52 clamped to the cable 26 and slidably mounted for movement back and forth along the fixed beam 15; and the cooperating clamping jaws 29 which are carried by the bracket 52 and are operable by the square oscillatory shaft 28. The bracket 52 is provided with a bore within which a cylindrical block 53 slidably embracing the shaft 28, is oscillatable; and this block 53 has an eccentric pin 54 pivotally engaging one arm of a bell crank lever 61 the medial portion of which carries a pin 55 and the opposite end of which has a transversely threaded pin 51. The pin 55 pivotally supports another lever 60 the outer end of which has another transversely threaded pin 51'; and a rod 62 having opposite hand threads at its opposite ends, coacts with the threaded openings in the pins 51, 51'. A leaf spring 59 has one end secured to the lever 60 while its opposite end is fastened to a block 63 and this block carries a pivot pin 54'; so that the levers 61, 60, rod 62, leaf spring 59 and block 63 constitute an adjustable and flexible link connecting the pivot pins 54, 54'. The medial portions of the jaws 29 are pivotally mounted in a slide 57 which is vertically movable in guideways 58 in the bracket 52, and the swinging lower ends of the jaws 29 are clampingly cooperable with the wire stock 33, while the upper extremities of these jaws are pivotally attached to toggle links 56 both of which are attached to the block 63 by the pin 54' which is also slidable in a slot 63' formed in the slide 57. When the adjustable linkage connecting the pivot pins 54, 54' is swung from the position of Fig. 6 to that of Fig. 11, the pin 54' moves downwardly and tends to straighten the toggle formed by the links 56 thereby swinging the jaws 29 against the wire, while the threaded rod 62 may be adjusted to vary the clamping effect.

The clamp jaw actuating shaft 28 is adapted to be periodically oscillated in opposite directions so as to open and bodily elevate the jaws 29 as in Fig. 6 when the clamp assembly 25 is being transported idly toward the cutting and stripping zone, and to bodily lower and close these jaws so as to grip the wire stock 33 as in Fig. 11 when feeding the stock forwardly beyond the said zone. When the square shaft 28 is in the position shown in Fig. 11 the centers of the shaft 28 and pins 54, 54' are approximately alined, and as the shaft 28 is rotated in a clockwise direction the jaws 29 will first be opened to release the wire 33 and will thereafter be lifted bodily away from the work by the side 57 until the position shown in Fig. 6 is reached. The jaws 29 will then clear the working tools during the return stroke of the clamp assemblage 25.

The oscillating means for the shaft 28 is of rather well known construction, and comprises a lower lever 64 which is oscillatable by the driving mechanism confined within the casing 16, an upper lever 65 firmly secured to the extreme end of the clamp jaw actuating shaft 28, and a longitudinally adjustable link 66 (Fig. 5) connecting the swinging ends of the levers 64, 65. The length of the link 66 is preferably adjustable so as to vary the angular position of the square shaft 28 and to thereby position this shaft for operation of the clamping jaws 29. It should be noted that the mechanism thus far specifically described is adapted to automatically and rapidly feed successive lengths of wire stock 33 from a source of supply past the guide 32 and the cutting and stripping zone with the aid of a single clamp assemblage 25, and to produce stripping movement of the severed wire ends, with utmost precision due to the arrangement and various adjustments of parts which have been provided.

The improved wire cutting and insulation stripping knife assembly 30 is shown in detail in Figs. 3, 4, 6, 8, 9 and 10, and consists essentially of a pair of front and rear cooperating wire severing knives 67; two sets each comprising a pair of front and rear cooperating insulation severing and stripping blades 68, 69 disposed at selected distances away from the plane of action of the knives 67; spacers 70 interposed between the sets of knives 67 and blades 68, 69; front and rear holders 71 for the knives, blades and spacers; two sets of normally fixed knock-out plates 72 piercing some of the spacers 70 and the adjacent holders 71; mechanism for moving the holders 71 and the cutting elements carried thereby toward and away from each other to cause the knives 67 and blades 68, 69 to cut, and to also cause the fixed plates 72 to release adhering insulation from the cutters; and the air jet nozzles 36 disposed above the cutting and stripping members. The spacers 70 may be of various thicknesses dependent upon the length of the stripping desired, and these spacers together with the blades 67, 68, 69 may be firmly clamped in their respective holders 71 by means of adjustable clamping screws 73. The holders 71 are properly positioned upon front and rear carrier plates 75, 74 by means of dowels 76, and may be firmly but detachably secured to their carrier plates by screws 77 the heads of which clampingly engage the adjacent holders. Each of the stationary knock-out plates 72 is provided with a lower end notch 78 and these notches are adapted to engage fixed plates 79 mounted upon the auxiliary upper or sub-frame 31, so that when the screws 77 are released, the blade assemblages 30 may be bodily upwardly removed.

Figure 4:
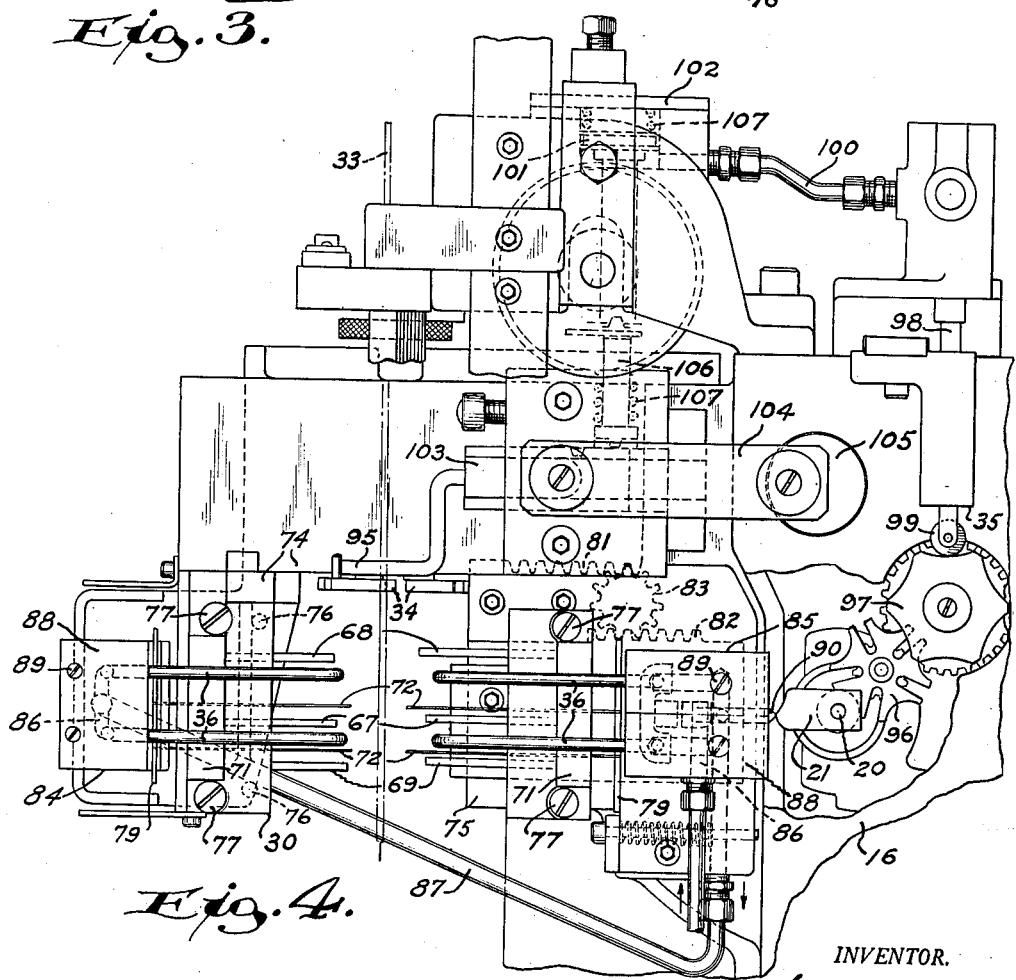
Fig. 4 is a similarly enlarged top view of the same cutting and stripping zone, also showing the stock holding fingers and the mechanism for actuating them.

The reversely reciprocable carrier plates 74, 75 upon which the blade holders 71 are mounted, are provided with rack teeth 81, 82 respectively, which coact with a pinion 83 rotatable about a fixed axis, as illustrated in Fig. 4. The carrier plate 74 is intermittently reciprocable by a connecting rod 104 which is moved back and forth by an eccentric 105 whereby the knives 67 and blades 68, 69 are alternately brought into cutting and stripping engagement with the wire stock 33 as in Fig. 8, and withdrawn from the cutting and stripping zone as in Fig. 4. When the knives or blades 67, 68, 69 are thus withdrawn, the stationary knock-out plates 72 function to release the stripped insulation from the knife edges, and the air nozzles 36 simultaneously deliver jets of compressed air downwardly toward the cutting edges so as to positively eject the removed strippings. These nozzles 36 have their adjacent ends formed to deliver the air jets downwardly while their other ends are pivotally mounted in air boxes 84, 85 mounted upon the sub-frame 31 and having compressed air conducting passages 86 therein connected by a pipe 87. The inlet ends of the nozzles 36 form pivots for permitting the outlet ends to be swung laterally for proper location of the jets, and the nozzles 36 are detachably confined within the boxes 84, 85 by resilient plates 88 held in place by screws 89. The rear air box 85 has a compressed air control valve 90 therein which is operable by the revolving cam plate 21 to periodically admit air to the passages 86 and to deliver the air jets from the nozzles 36 at the proper moments, thus making the jet delivery automatic whenever the knife blades are retracted.

The wire stock guide 32 at the feed end of the machine is formed to permit advancement of the stock 33 only toward the cutting and stripping zone, and will therefore prevent the stock from backing up toward the supply source. When cutting and stripping short lengths within the range of travel of the feed clamp 25 the guide 32 co-operates with the blades 68 to hold the wire stock 33 taut so that the clamping jaws will always pick up the wire from a central position so that it is unnecessary to provide other wire holding means during such operation. It is however desirable when performing long length cutting to provide holding fingers 34 which are adapted to clamp the wire 33 before each release of the jaws 29 at the end of each forward stroke of the clamp 25 and to hold the wire stock between the guide 32 and fingers 34 taut until the clamp has completed its return stroke and the jaws 29 have again engaged the stock 33 at the end of the latter stroke. These holding fingers 34 are shown in Figs. 3, 4, and 6, and are mounted on pivots 91 which are geared together so as to cause the fingers to simultaneously swing toward or away from each other. They are biased to swing apart by a tension spring 93 and may be fixedly separated so as to make them inactive by a manually operable cam 94 as illustrated in Fig. 6. However, when long cutting is to be effected, the cam 94 should be positioned as in Fig. 3, whereupon the fingers 34 are oscillatable mechanically by a push rod 95 coacting with the front finger 34, which as previously indicated is adapted to cause the holding fingers to clamp and hold the incoming wire stock 33 whenever the feed clamp 25 has reached the end of its stroke remote from the cutting and stripping zone and until this clamp 25 has returned for a subsequent wire advancing movement.

The mechanism for automatically effecting such long cutting of the stock 33 and for controlling the actuation of the holding fingers 34 is shown in Figs. 1, 4, and 5, and consists generally of a Swiss movement 96 driven from the operating mechanism confined within the frame casing 16; a multiple plate cam wheel 97 operable by the movement 96; a valve 98 having a roller 99 cooperable with the cam surfaces to control the admission of compressed air through a pipe 100 to a piston 101 confined within a casing 102; a driving slide 103 which carries the push rod 95 and is connectible for reciprocation by means of a connecting rod 104 to an intermittently revolving crank 105; a plunger 106 (Fig. 4) having a tooth 106' engageable with a notch 107' in the side of the slide 103 and being operable by the piston 101 and springs 107 to control the connection of the slide 103 to the carrier plate 74; and indexing means 108 of well known construction for shifting the plates of the cam wheel 97 so as to determine the number of reciprocations which the feed clamp 25 must make in order to produce the desired lengths of stock to be cut. The Swiss movement 96 is of well known construction and is driven by the shaft 20, and the compressed air which is controlled by the valve 98 and which actuates the piston 101 may be derived from the same source which delivers air to the nozzles 36; and the indexing means 108 may be manually operated to cause the working tools to become effective whenever the desired number of strokes of the clamp 25 has taken place, so that the successive long sections cut and stripped will be of precisely the same length. This indexing mechanism is not new, but the compressed air releasing of the driving connection for the slide 103 materially simplifies the knife actuating mechanism.

While the normal operation and functioning of the improved wire cutting and stripping unit should be apparent from the foregoing detailed description, a résumé thereof will be given. When the crank 22 has been properly adjusted to produce the successive lengths of wire 33 desired, and the stripping blades 68, 69 have been properly positioned to strip the cut ends of the wires, the working tools may be caused to clamp the leading end of the stock and the clamp assembly 25 will thereafter become attached to the incoming end of the wire supply and the motor 18 should then be drivingly connected to the drive mechanism within the casing 16. This mechanism will thereafter function to cause the feed clamp to strip the leading wire end and to then pull successive lengths of the wire stock 33 past the guide 32 and through the stripping zone, and to subsequently move the cutting knives 67 toward each other to sever the wire and to simultaneously move the complementary stripping blades 68, 69 toward each other so as to cut through the insulation.

While the blades 68, 69 are thus positioned and the clamp jaws 29 are still active as in Fig. 11, the bar 48 flexes the toggle consisting of the bracket 44, pivot shaft 39, and the cranks 45, 46 to cause the clamp assembly 25 to pull the wire 33 a short distance forwardly away from the stripping zone and to thereby strip the insulation from the tail end of the severed length of the wire 33. The clamp jaw actuating shaft 28 is then rotated in one direction to release and subsequently elevate the jaws 29, thereby dropping the finished article, whereupon the clamp 25 is moved along the beam 15 past the cutting and stripping zone without obstruction.

Then the shaft 28 is rotated in the opposite direction to cause the jaws 29 to descend and to again grip the wire stock 33, and the bar 48 thereafter actuates the assemblage of Fig. 7 so as to pull the incoming wire stock rearwardly away from the cutting zone thus stripping the insulation from the leading severed end thereof. The carrier plate 74 is then moved to separate the knives, and during separation of the cutting and stripping blades, the knock-out plates 72 and the air jets delivered from the nozzles 36, cooperate to positively remove and eject the insulation strippings. As this cycle of events is repeated, the continuous wire supply is severed into precisely equal lengths at a high rate of speed, and the wire ends are stripped while the removed strippings are positively ejected.

When cutting and stripping short lengths, the holding fingers 34 need not be utilized and will be held in inactive position as in Fig. 6. However, when successive sections of greater length than the range of travel of the clamp 25 are to be cut, the fingers 34 are made active by releasing the cam 94 and the indexing means 108 may be set to produce the desired long lengths. The long cutting control mechanism will then function to automatically cause the clamp 25 to feed or pay out several successive lengths within its range of travel and corresponding to the setting on the index, before each of the successive cutting and stripping operations take place. This mechanism for effecting long length cutting is operable by compressed air to effectively engage and disengage the plates 74, 75 relative to the reciprocating slide 103.

From the foregoing detailed description of the construction and operation of the wire cutting and stripping unit, it should be apparent that I have in fact provided various improvements whereby the precision, flexibility, speed, and dependability of such devices is enhanced to a maximum. All parts of the improved mechanism are conveniently accessible for inspection and adjustment; and in order to remove the cutting and stripping knife assemblages together with the knock-out blades 72 as a unit, it is only necessary to swing the nozzles 36 out of the way and to release the screws 77 whereupon the holders 71 and the elements associated therewith are freely upwardly removable. They may be just as quickly replaced thus saving considerable time and labor especially when changing blades and blade settings for short runs. The air jets delivered from the nozzles 36 effectively cooperate with the knockout plates 72 to eject the installation strippings, and the nozzles 36 are easily adjustable so as to direct the jets to various localities.

The improved single clamp wire stock stripper and feeder functions most effectively to strip either both ends of each cut section, or either end thereof alone by omitting one or the other set of stripping blades 68, 69. The toggle actuation of the jaws 29 provides positive gripping pressure without danger of damaging the gripped insulation, and the spring 59 cooperating with the improved toggle actuating mechanism produces resilient gripping while the gripping pressure may be readily varied with the aid of the oppositely threaded adjusting screw rod 62. The range of travel of the clamp assembly 25 may also be quickly and accurately varied by merely varying the throw of the crank 22 while the clamp 25 is released from the drive, and the mechanism shown in Fig. 7 produces positive and most effective stripping movement of the clamp 25 in both directions.

The long cutting mechanism and controls may be utilized to cut wire sections each having a length several times the range of travel of the single feed clamp and cooperates with the holding fingers 34 to insure accurate cutting of these long sections. The apparatus is also cooperable with either solid or stranded wire stock of various wire and insulation diameters, and has proven highly successful and efficient in commercial operation for diverse purposes. The flexibility and ease of adjustment for producing various lengths of stripped wire permits operation at very high speed resulting in enormous capacity for compact and relatively portable units, and the ejector air jets also aid in rapidly removing the successive finished articles from the cutting and stripping zone.

It should be understood that it is not my desire to limit this invention to the exact details of construction or to the precise mode of operation and functioning of the typical insulated wire cutting and stripping assemblage herein shown and described for various modifications within the scope of the appended claims may occur to persons skilled in the art.

I claim:

1. In a wire cutting and stripping machine, means forming a cutting and stripping zone, wire cutting and stripping tools located at said zone, a reciprocating rod for periodically actuating said tools, a single reciprocable clamp for feeding insulated wire stock longitudinally through said zone, mechanism for moving said single clamp toward and away from said zone, means cooperable with said mechanism for causing said clamp to feed several successive lengths of the stock within the limits of travel of the clamp between each successive cutting and stripping operations of said tools, holding fingers cooperable with the wire stock after each feeding stroke of said clamp while feeding said successive lengths, a slide operatively connected to said tools and fluid pressure actuated means for drivingly connecting said slide to said rod to control the operation of said tools.

2. In a wire cutting and stripping machine, means forming a cutting and stripping zone, complementary sets of wire cutting and stripping tools located on opposite sides of said zone a single reciprocable clamp for feeding successive lengths of insulated wire stock longitudinally into said zone, mechanism for moving said clamp toward and away from said zone and past said tools, a reciprocable driving rod for periodically actuating said tools, a slide operatively connected to both of said tool sets, and a fluid pressure actuated plunger for connecting said driving rod to said slide to effect actuation of said tools at the end of each stock feeding movement of said clamp.

3. In a wire cutting and stripping machine, means forming a cutting and stripping zone, wire cutting and insulation cutting and stripping knives located at said zone, means for moving said knives laterally toward and away from said zone, a single reciprocable clamp for feeding insulated wire stock longitudinally through said zone while said knives are separated, mechanism for moving said clamp toward and away from said zone and past said knives, means cooperable with said mechanism for causing said clamp to feed several successive lengths of the stock within the limits of travel of the clamp past said zone between each of the successive cutting and stripping operations of said knives, and means for positively holding the wire stock against longitudinal displacement after each feeding stroke of said clamp when feeding said successive lengths.

4. In a wire cutting and stripping machine, means forming a cutting and insulation removal zone, wire cutting and insulation removing tools located at said zone, a reciprocable driving element for actuating said tools, a reciprocable clamp for feeding insulated wire stock longitudinally past said zone, mechanism for reciprocating said clamp past said zone, means for causing said clamp to feed more than one length of wire stock as determined by the limits of reciprocation of the clamp during each interval between successive cutting and stripping operations of said tools, a slide operatively connected to said tools, and fluid pressure actuated means for drivingly connecting said slide to said reciprocable element to control the operation of said tools.

5. In a wire cutting and stripping machine, means forming a cutting and insulation removal zone, complementary sets of wire cutting and insulation removing tools located at said zone, a reciprocable clamp for feeding successive lengths of insulated wire stock longitudinally past said zone, mechanism for reciprocating said clamp toward and away from said zone and past said tools, a reciprocable driving rod for periodically actuating said tools, a slide operatively connected to both of said tool sets, and a fluid pressure actuated member operable to connect said driving rod to said slide to effect both cutting and insulation removing actuation of said tools at the end of each stock feeding movement of said clamp.

6. In a wire cutting and stripping machine, means forming a cutting and insulation removal zone, complementary sets of wire cutting and insulation removing tools located at said zone, means for moving said tools laterally toward and away from said zone, a clamp for feeding insulated wire stock longitudinally through said zone while said complementary sets of tools are separated, mechanism for moving said feeding clamp toward and away from said zone and past said tools, means cooperable with said mechanism for causing said clamp to feed more than one length of wire stock within the limits of travel of the clamp past said zone during the interval between each of the successive operations of said tools, and means for positively holding the wire stock against longitudinal displacement after each feeding stroke of said clamp.

References Cited in the file of this patent

UNITED STATES PATENTS

| Number | Name | Date |
|---|---|---|
| 1,733,294 | Cross | Oct. 29, 1929 |
| 1,753,561 | Emmert | Apr. 8, 1930 |
| 1,787,658 | Andren et al. | Jan. 6, 1931 |
| 1,801,278 | Knuuti | Apr. 21, 1931 |
| 1,831,115 | Holmes | Nov. 10, 1931 |
| 1,835,801 | Mayhew et al. | Dec. 8, 1931 |
| 1,874,216 | Andren | Aug. 30, 1932 |
| 1,987,959 | Knuuti et al. | Jan. 15, 1935 |
| 2,394,174 | Hessler | Feb. 5, 1946 |
| 2,464,959 | Andren | Mar. 22, 1949 |
| 2,497,112 | Andren | Feb. 14, 1950 |
| 2,571,078 | Vollmer | Oct. 9, 1951 |